United States Patent
Guglielmo et al.

(10) Patent No.: US 9,156,372 B1
(45) Date of Patent: Oct. 13, 2015

(54) MULTINODAL BALLAST AND TRIM CONTROL SYSTEM AND METHOD

(75) Inventors: Kennon Guglielmo, San Antonio, TX (US); Levi Brinson, Tulsa, OK (US); Joseph Grogan, San Antonio, TX (US)

(73) Assignee: Enovation Controls, LLC, Tulsa, OK (US)

( * ) Notice: Subject to any disclaimer, the term of this patent is extended or adjusted under 35 U.S.C. 154(b) by 799 days.

(21) Appl. No.: 13/457,287

(22) Filed: Apr. 26, 2012

Related U.S. Application Data

(60) Provisional application No. 61/479,395, filed on Apr. 26, 2011.

(51) Int. Cl.
*B60L 15/00* (2006.01)
*B63B 35/00* (2006.01)

(52) U.S. Cl.
CPC . *B60L 15/00* (2013.01); *B63B 35/00* (2013.01)

(58) Field of Classification Search
CPC ........ B63C 11/42; B63B 22/18; B63B 35/00; B63B 35/731; B63B 2035/007; G06F 8/38
USPC .............................. 701/21, 36, 49; 114/144 A
See application file for complete search history.

(56) References Cited

U.S. PATENT DOCUMENTS

| | | |
|---|---|---|
| 3,748,466 A | 7/1973 | Sibley et al. |
| 4,261,278 A | 4/1981 | Gaudin |
| 4,708,672 A | 11/1987 | Bentz et al. |
| 4,749,926 A | 6/1988 | Ontolchik |
| 5,074,810 A | 12/1991 | Hobbs et al. |
| 5,107,786 A | 4/1992 | Templeman |
| 5,110,310 A | 5/1992 | Hobbs et al. |
| 5,142,473 A | 8/1992 | Davis |
| 5,263,432 A | 11/1993 | Davis |
| 5,488,919 A | 2/1996 | Ferreiro et al. |
| 5,647,780 A | 7/1997 | Hosoi |
| 5,828,979 A | 10/1998 | Polivka et al. |
| 5,828,987 A | 10/1998 | Tano et al. |
| 6,227,918 B1 | 5/2001 | Wharton |
| 6,283,240 B1 | 9/2001 | Beever |
| 6,353,781 B1 | 3/2002 | Spivak |
| 6,485,341 B1 | 11/2002 | Lanyi et al. |
| 6,487,500 B2 | 11/2002 | Lemelson et al. |
| 6,517,396 B1 | 2/2003 | Into |
| 6,573,486 B1 | 6/2003 | Ratkovic et al. |
| 6,702,629 B2 | 3/2004 | Adamczyk |
| 6,779,752 B1 | 8/2004 | Ratkovic |
| 6,884,128 B2 | 4/2005 | Okuyama et al. |
| 7,128,014 B2 | 10/2006 | Berthiaume et al. |
| 7,193,559 B2 | 3/2007 | Ford et al. |

(Continued)

OTHER PUBLICATIONS

Race Technology Ltd., Speedbox Instruction Manual Version 1.0, 2007, Race Technology Ltd., Nottingham, England, United Kingdom.

*Primary Examiner* — Gertrude Arthur Jeanglaude
(74) *Attorney, Agent, or Firm* — William H. Quirk; Jesse L. Frizzell; Rosenthal Pauerstein Sandoloski Agather LLP

(57) ABSTRACT

A flexible and reconfigurable sport and ski watercraft power control system that not only distributes power but also wirelessly distributes power management to multiple nodes on the watercraft, typically via CAN network and typically to nodes in the helm, bow and stern areas, for driving and controlling ballast and trim motors as well as other powered subsystems that affect the operation, motion and attitude of the watercraft.

13 Claims, 3 Drawing Sheets

(56) References Cited

U.S. PATENT DOCUMENTS

| | | |
|---|---|---|
| 7,214,110 B1 | 5/2007 | Ehlers et al. |
| 7,229,330 B2 | 6/2007 | Walser et al. |
| 7,230,567 B2 | 6/2007 | Arakane et al. |
| 7,239,953 B2 | 7/2007 | Braunberger et al. |
| 7,311,058 B1 | 12/2007 | Brooks et al. |
| 7,465,203 B2 | 12/2008 | Walser et al. |
| 7,485,021 B2 | 2/2009 | Walser et al. |
| 7,491,104 B2 | 2/2009 | Walser et al. |
| 7,494,393 B2 | 2/2009 | Walser et al. |
| 7,494,394 B2 | 2/2009 | Walser et al. |
| 7,565,876 B2 | 7/2009 | Wilson et al. |
| 8,216,007 B2 | 7/2012 | Moore |
| 8,457,820 B1 | 6/2013 | Gonring |
| 2004/0015277 A1* | 1/2004 | Cardoza et al. .............. 701/21 |
| 2005/0016430 A1* | 1/2005 | Cardoza et al. .......... 114/144 A |
| 2008/0164370 A1 | 7/2008 | Walden et al. |
| 2010/0198435 A1 | 8/2010 | Cansiani et al. |

* cited by examiner

MULTINODAL BALLAST AND TRIM CONTROL SYSTEM AND METHOD

NONPUBLICATION REQUESTED—NONPROVISIONAL APPLICATION

This application is a nonprovisional application under 37 CFR 1.53(b) and is submitted with an accompanying nonpublication request in accordance with 35 U.S.C. §122(b). Accordingly, the subject matter of this application is to be maintained in secrecy until and unless Applicant allows a patent to issue based on this application.

BACKGROUND

1. Field of the Invention

Many aspects of the present invention relate generally to the field of sport and ski watercraft and, more particularly, to power configurations for controlling sport and ski watercraft subsystems including attitude control modules for a watercraft.

2. General Background

"Sport and ski" watercraft refers to various classes of both outboard and inboard power boats used for recreation, sporting and exhibition activities. Various popular makers and distributors in the United States include Mercury, MasterCraft, Supra, Moomba, Centurion, SkiersChoice, and many others. The design of any particular sport and ski watercraft is very complicated, and there has long been a need to provide flexibly-reconfigurable subsystems to more readily accommodate umpteen different combinations of finish-line design choices to suit a particular group of customer demands. It may start with more basic design choices such as deciding what type of hull to use with what type/size of propulsion system and what type of capacity for passengers, towing, speed, versatility etc., but that's only the tip of the iceberg.

Once the more general choices are made, more detailed levels of design involve everything from things like whether it needs sonar and live-well capability for fishermen, or wake plates or trim tabs for skiers, or the types of stereo systems to accommodate, or how many ballast tanks might be desired for better control of the boat's attitude in the water, and where lights should be placed around the boat, . . . and how bright, and what color, and should they be mounted by chrome or matted finish brackets, and . . . on and on.

As a result, as one can imagine, there has been a long felt need to have wiring systems and power distribution arrangements that are flexibly-reconfigurable enough to accommodate the wide range of possible needs. Indeed, such long-felt needs have induced an entire industry of supply manufacturers that are constantly redesigning their systems to accommodate the wide variety of feature selections that sport and ski boat customers (and, hence, the boat manufacturers, customizers and distributors) might desire.

Many other advantages, disadvantages, objectives, problems and challenges of sport and ski boat design, and of the known power distribution, wiring and control systems therefor, will be evident to those of ordinary skill in the art, particularly after reading this specification and thinking about its implications.

SUMMARY OF THE PRESENT INVENTION

It is a fundamental object of the present invention to improve over the prior art, including to provide a more flexible and/or more reconfigurable components for power distribution and control system for sport and ski watercraft. Under such fundamental objects, they are also objects of the present invention to enable subsystems as well as finished watercraft designs that are safer, cleaner, simpler, quieter, and easier to assemble, install, connect, maintain, repair and troubleshoot, as well as being more reliable, affordable, efficient, versatile, effective, interchangeable and adaptable.

These and other objects are addressed by providing components, networks, configurations, systems, subsystems, and overall watercraft designs that follow various teachings of the present invention that will be evident to those of skill in the art after reading and contemplating this specification and any drawings and claims that may be appended hereto or later supplemented or amended.

Many other objects, features, variations and advantages of the invention will be evident from a review of the further descriptions herein, particularly when reviewed by one of ordinary skill in the art with the benefit of the accompanying drawings, prior art, and any claims that may be associated with this specification.

DETAILED DESCRIPTION OF PREFERRED EMBODIMENTS

Information Incorporated by Reference

This description incorporates by reference the entire disclosures of U.S. Pat. No. 7,465,203 dated Dec. 16, 2008, entitled "Watercraft Speed Control Device," and U.S. Pat. No. 7,494,394 dated Feb. 24, 2009 entitled "Watercraft Speed Control Device."

General Boat Layouts.

Figure 1:
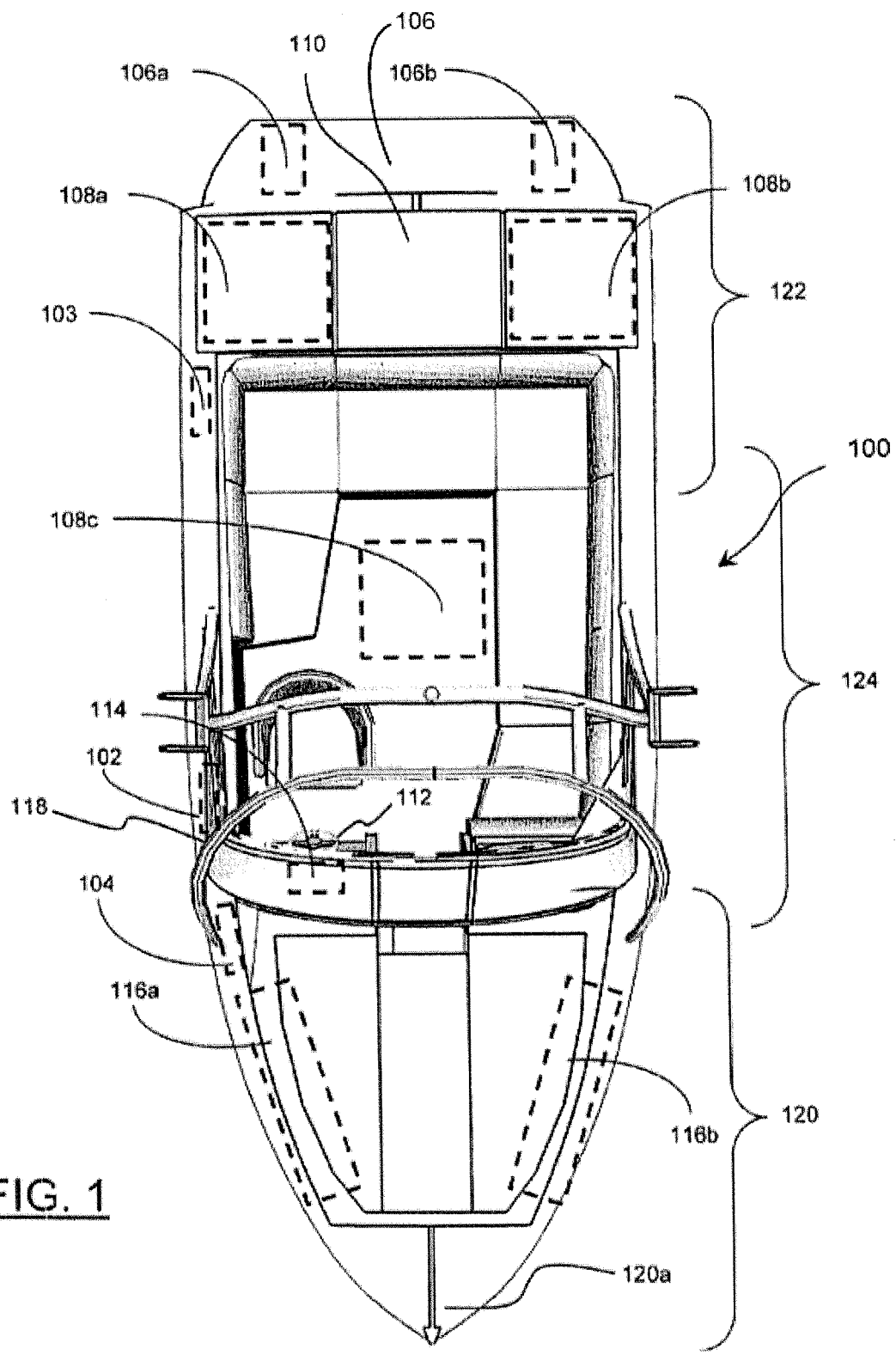
FIG. 1 illustrates a representative sport and ski watercraft 100 equipped with a preferred configuration of control system 101 using multiple preferred power distribution modules 102-104 to control ballast, trim and other loads of watercraft 100.
Figure 2:
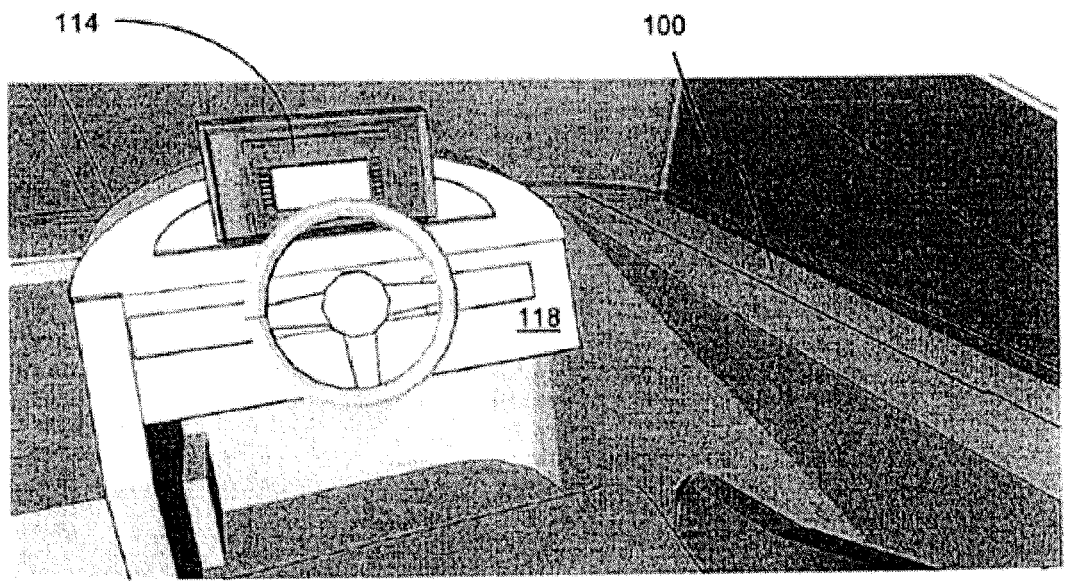
FIG. 2 illustrates the helm 118 of watercraft 100.
Figure 3:
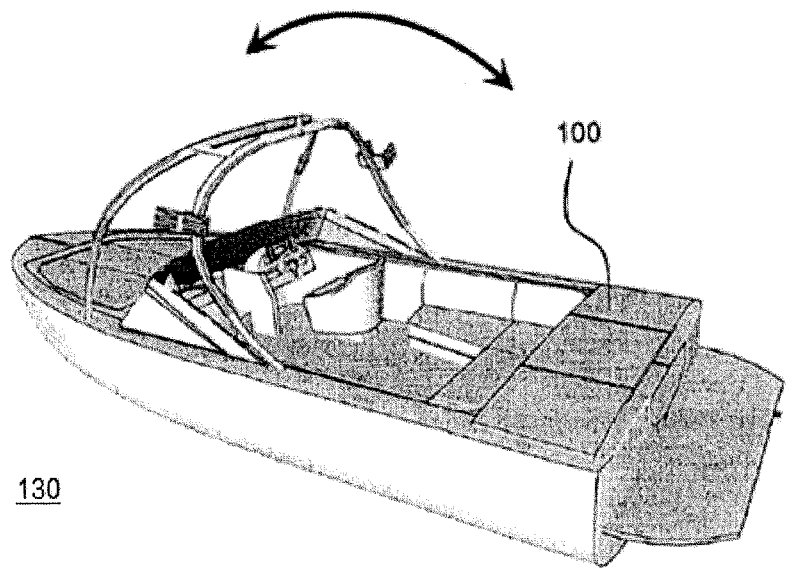
FIG. 3 illustrates a perspective view of boat 100 in body of water 130.

The present invention relates generally to optimally distributed power control in sport and ski watercraft such as boat 100 illustrated in FIG. 1. Various aspects of the invention enable flexible adaptation of relatively conventional power distribution systems into distributed configurations that preferably use one or more versatile power control modules positioned in particular regions of the boat (such as the bow, stern and central regions 120, 122 and 124, respectively) in order to serve power loads that are likewise situated generally in the same regions 120, 122, 124. Each such regionally-focused power control module 102-104 is preferably networked to communicate with the other modules as well as the helm display controller 114, the speed monitoring system, and the engine control module (ECM) in a pier-to-pier network configuration that allows each module to receive commands through a communications interface, preferably using standard CAN protocols and strategies. With such configurations, and with software in each module 102-104 that allows for intelligent deductions about the operation of the various powered systems in each region of the boat 100, the resulting system 101 is adapted to intelligently route power from one or more power supplies (i.e., boat batteries and/or generators) to the numerous powered systems located all around the boat 100.

In one preferred configuration for embodiments of the invention, as shown in FIG. 1, watercraft 100 is equipped with three power distribution modules (102, 103 and 104. The modules 102-104 are connected by a CAN network to a central display 114 located at the helm 118, to enable easy and safe operation of the watercraft 100. FIG. 1 also illustrates various regions of the boat 100 that are spaced from helm 118—namely the central region 124, the bow region 120, and stern region 122, where the bow and stern regions 120, 122 are the most remote from helm 118, and the center portion 124 of the watercraft 100 where one or more power distribution modules (102, 103 and 104) can be mounted. At least one power distribution module 103 at stern 122 controls rear ballast 108, wake plate (or trim tabs) 106 and other loads of the watercraft 100. Another power distribution module 104 near to the helm controls forward ballast tanks 116 and other loads in the bow region 120 of boat 100. The power distribution module 104 is mounted to a relatively vertical wall within a hull chase of boat 100. Its position proximal to the helm portion 118 of the watercraft 100 allows it to efficiently control and distribute power to different systems and loads in the central region 124 and bow region 120 of the watercraft 100 as and when required while operating the watercraft 100. Further, another power distribution module 102 at center 124 of the watercraft 100 may also be used to control loads in the central region 124 of the boat 100.

In an exemplary embodiment of the invention, the watercraft 100 may simultaneously use multiple power distribution modules such as eight or more power distribution modules to control multiple parts, functions and loads of the watercraft 100.

In another embodiment of the invention, the power distribution modules (102, 103 and 104) can control or tune rudder of the watercraft 100 while it can measure and control water depth, water temperature and air temperature. Further it can respond to indicators such as "V-drive" warning indicator, trim tab indicator, switch blade system control indicator. The switch blade system control indicator indicates the position of the blade when the system is ON. Also the power distribution modules (102, 103 and 104) can control navigation lights, live well pump, blower, cockpit heater and any other type of electrical load that might be encountered on a sport and ski watercraft 100.

Multinodal Controller Area Network (CAN) System.

The CAN system of the preferred embodiment is an open system intercommunication system that provides a cost-effective communication network of onboard electronics in a distributed manner such that each module 102-104 preferably serves as a node in a multinodal CAN system. By distributing power control to the various modules 102-104, the expense and complexity of the necessary wiring harnesses connected to and between the power supply and such modules 102-104 and the various power loads on the boat can be greatly simplified, which in turn allows for other benefits such as added space, reduced electrical noise, reduced risk of fire, ease of troubleshooting, and numerous other advantages that will be evident to those of skill in the art.

Deductive Smart Control.

Preferred embodiments of the invention also take advantage of load performance variations that can be monitored within each of the power distribution modules (102, 103 and 104). Typical load variations that modules 102-104 are adapted to monitor include voltage and current, and changes in voltage and current relative to steady-state or calibrated levels for the same, as well as the rate of such changes, all of which are preferably monitored by a processor in each of the corresponding modules 102-104 in order to deduce what is likely occurring in the powered subsystem that is served by the corresponding load. With such deductive monitoring, the overall control system that uses such modules 102-104 enables enhanced control of the respective loads.

For instance, module 103 is mounted within a chase of the hull sidewall (or adjacent frame members) in a vertical orientation in the stern 122 of boat 100, where a grouping of various power systems (or loads) 106, 108 and others tend to be generally located. Loads 106 and 108 control two different kinds of attitude controllers. Connections are completed such that, in operation, power supply lines feed electrical power to module 103, which in turn controls power distribution to the grouping of loads 106, 108, and others that generally tend to be proximal to the stern 122 of the boat 100.

The single module 103 preferably controls power distribution to a grouping of loads including loads that represent at least two kinds of systems that can affect the attitude of the boat 100 relative to the surface of the surrounding body of water. One such kind of attitude-control system is preferably a wake plate (or trim tab) 106. As is conventional, the function of wake plate 106 depends on its position relative to the hull of the boat 100 and the surrounding body of water 130, which in turn is controlled by one or more electrical actuators 106*a*, 106*b*, which may be electrical screw jacks or the like. To intelligently control the wake plate, the microprocessor of power distribution module (PDM) 103 is calibrated to recognize the characteristics of the load to motors 106*a*, 106*b* during normal operation versus end-of-limit operation. Then in operation, the calibrated controller is able to deduce when the corresponding motor has reached (or is about to reach) its limit of safe operation, at which point module 103 terminates (or reverses) power to the corresponding load.

Meanwhile, loads 108 control another kind of attitude-control system—ballast tanks 108*a* and 108*b*—by controlling power to pumps that either fill or empty the tanks 108*a*, 108*b*. Much as with control of motors 106*a*, 106*b*, control of pumps 108*a*, 108*b* is intelligently managed by module 103 based on the real-time characteristics of the power being delivered to pumps 108*a*, 108*b*. Deductions are made by the controller according to the understanding that ballast pump speed (and load) will change when the corresponding ballast tank approaches empty (indicated by higher pump speed or a lower differential between actual load and the calibrated load for a no-load set-up). Conversely, the opposite type of change in load to pumps 108*a*, 108*b* is interpreted by module 103 as indicating a full ballast tank. In either case, module 103 then either discontinues power to motor 108*a*, 108*b*, or reverses the same.

As will be understood, alternatives may use various no-load, open loop or steady state load characteristics to effectively recalibrate during the course of operation.

Hence, module 103 (and, likewise, modules 102 and 104) are adapted to automatically control the ballast pump system by sensing indication from the load itself which serves the ballast pumps. Alternatively, float switches may be used, but this is less preferred. The ballast pump can also be operated manually by a switch 112 at the helm 118.

Ballast Control.

Still in another embodiment of the invention the ballast tank system is controlled by the power distribution modules (102, 103 and 104) at bow 120, stern 122 and center region 124 of the watercraft 100. The purpose of ballast tanks is to add weight to the boat in designated areas to help produce larger wakes for water sports activities, such as wakeboarding and wake surfing. Two such ballast tanks 116*a* and 116*b* at bow end 120 of the watercraft 100 are shown in FIG. 1. The ballast system consists of water tanks, pumps, seacocks, hardware and controls. Panel-mounted switches 112 activate water pumps that fill and drain the tanks with seawater. Seacocks are used to open and close seawater drains. When the ballast tanks are filled, it is desirable to reduce the total weight in the boat as by adding ballast, the boat becomes heavier thus fewer passengers and/or gear are allowed in order to keep the boat within legal and safe weight limits. If the tank fills beyond its capacity, the excess water will drain from the tank vent. The pump will continue to operate until the switch is returned to the OFF position.

Also whether a ballast tank is full or empty is sensed based on pump RPM. Comparing to historical experience for operation of a particular ballast tank pump, when its RPM suddenly goes up for more than one second, the power distribution modules conclude (102, 103 and 104) that the particular tank is empty. When ballast tank pump RPM suddenly goes down, the power distribution modules (102, 103 and 104) conclude that the ballast tank is full.

Ventilation Control.

In still another embodiment of the invention, the engine compartment ventilation or blower system can be controlled by the power distribution modules of the watercraft 100. The ventilation or blower systems are designed to remove explosive vapors that accumulate in the ballast area and engine compartment. Proper ventilation is extremely important to personal safety boating.

Trim Tab Control.

Further in another embodiment of the invention, the power distribution modules can control the trim tabs. As shown in FIG. 1 the power distribution module 103 controls the trim tab 106. The trim tab 106 can be controlled from the helm 118 by a switch 112. Further a position indicator helps in efficient control of the trim tab 106. As the trim tab 106 enhances the planing ability of the watercraft 100, when used on inboard ski boats a single trim tab is used to enhance and control the type of wake desired by controlling the hull running attitude. The wake characteristics can be controlled to enhance water sports such as wakeboarding, barefooting, kneeboarding and towables. A single tab 106 is usually mounted in the center rear of the hull. Tab movement is controlled via the power distribution module 103 from a helm-mounted switch 112, which activates an electric or electric/hydraulic attached to the tab 106.

In an exemplary embodiment of the invention, the power distribution module 103 controls the trim tab 106 when operating at wakeboarding speed, with the trim tab 106 in the UP position, the bow rises and the hull rides normally, creating heavy water displacement and large wakes and when operating at skiing speeds, with the trim tab 106 in the DOWN position, the bow lowers and helps the boat to plane quickly for skiing and slalom skiing-type wakes and allows for pulling more and/or heavier skiers.

Switch Blade.

In another embodiment of the invention, the power distribution modules 104 can control the switch blade. The switch blade can be controlled by the power distribution module 104 being indicated from a helm-mounted switch 112. It can be programmed to run in AUTO mode or in MANUAL mode.

Wake Tower.

In still another embodiment of the invention, the power distribution modules 104 can control wake towers, wherein wake towers are used to provide a higher towing point for water sports and to mount lights and other accessory equipment.

Heater.

In still another embodiment of the invention, the power distribution modules 104 can control the cockpit heater system. The marine heater uses the heated engine coolant to produce forced air heat through a ducted location in the boat or through a snorkel-type tube. Heated engine coolant is circulated through a heater core and an electric blower fan moves air over the heater core, transferring heat from the heater core to the ducted area air in the boat or on the windshield. Where applicable, the snorkel tube can be moved anywhere within its reach to provide an isolated heat duct. A helm 118 or remote panel-mounted ON/OFF switch 112 operates the heater blower fan via the power distribution module 104.

Display Master.

Further in another embodiment of the invention, the display 114 located on dashboard at the helm 118 of the watercraft 100 acts as the master device for the watercraft 100. The display 114 will send configure messages on boot up to assure that the power distribution modules (102, 103 and 104) are configured as expected. Upon operation, based on user interface, the display will send messages to turn on and off outputs in the power distribution modules (102, 103 and 104). This is done through a CAN message or via any communication network message. Signals communicated are the desired pulse width modulation (PWM) level in percent. In sequence of turning on loads the software in the display calculates the level of the loads and turns the output off after the desired condition or time has been reached. The central display 114 is connected with switch panel 112 to control the desired load via the power distribution modules (102, 103 and 104). The switch panel 112 contains multiple ON-OFF switches and multiple analog switches to desirably control the loads.

Power Distribution Module.

Figure 4:
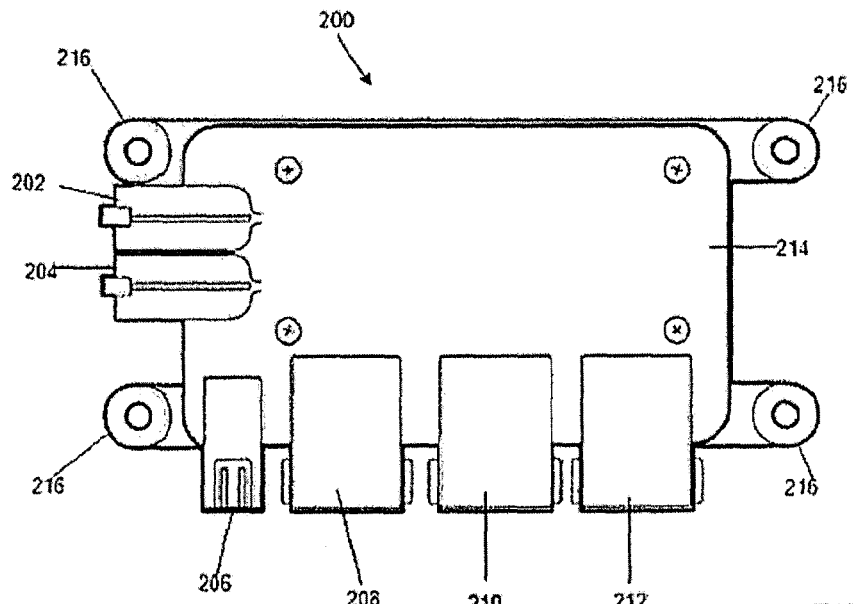
FIG. 4 illustrates the configuration of the power distribution module 200 of FIGS. 1 and 2.

In another embodiment of the invention, FIG. 4 shows the configuration of the power distribution module 200 for a watercraft. The power distribution module 200 comprises one or more input ports (202, 204), one or more output ports (208, 210, 212), a housing 214 to hold the power distribution circuit board and associated elements responsible (not shown) for intended power distribution. The exterior of the housing has provisions 216 for mounting on to the surface of the watercraft 100 at desired mounting points.

In still another embodiment of the invention the power distribution module 200 is linked with a display 114 as shown in FIG. 1, thereby allowing visual and efficient control of trim tabs, ballast pumps, lighting, blowers and more. The central display module 114 is connected to all the power distribution modules 200, thereby displaying the load condition on the screen by sending signals in pulse width modulation from the power distribution modules 200 via the communication network or CAN.

In an exemplary embodiment the power distribution module 200 is designed for use in 12V to 24V systems and supports CAN J1939 communications, which allows users to remotely monitor and configure inputs and outputs.

Further in another embodiment of the invention, the power distribution module 200 features solid-state circuit protections which eliminate the need for fuses. The power distribution module 200 provides current and electromotive force (EMF) feedback for actuator protection and accuracy.

In another embodiment of the invention the power distribution module 200 features reverse voltage protection.

In another embodiment of the invention the power distribution module 200 can operate at variable temperature conditions and preferably at temperature range between −40° C. to 85° C. (−40° to 185° F.).

In another embodiment of the invention the power distribution module 200 can accept multiple digital inputs at a time. In a preferred embodiment the power distribution module can accept twelve digital inputs and can monitor switch inputs in both ground and Vbat condition, providing up to twenty four separate switch inputs.

In another embodiment of the invention the power distribution module 200 can accept multiple analog inputs and preferably the power distribution module 200 can accept eight analog inputs.

In another embodiment of the invention the power distribution module 200 can provide multiple digital outputs. In a preferred embodiment the power distribution module can provide twelve digital switching outputs. Further the twelve outputs are H-Bridge configurable. The power distribution module 200 can provide 12 high side or 6 H-Bridge 25 amp current drive.

In an exemplary embodiment the digital switching outputs are 5 volt outputs which are sufficient for sensor excitation.

In another embodiment of the invention the power distribution module 200 has an output current capacity up to 15 amps steady-state per output (channel) which is either single ended or H-bridge configurable. Further some of the output signals have 30 amp capacity. In an exemplary embodiment the total steady-state current allowed simultaneously for all outputs is about 70 amps although it can be varied without departing from the scope of the invention.

In another embodiment of the invention the power distribution module 200 has one or more communication ports 206. In this invention communication port CAN J1939, LIN is used however other communication ports 206 can be used without departing from the scope of the invention. The communication ports are internally potted and sealed to provide integrated circuit protection.

In another embodiment of the invention the power distribution module has several connectors.

In another embodiment of the invention the power distribution module 200 is 6.5 inch in height, 5.5 inch wide and 2 inch depth, although several modifications to the dimension of the power distribution module 200 can be done without departing from the scope of the invention.

Figure 5:
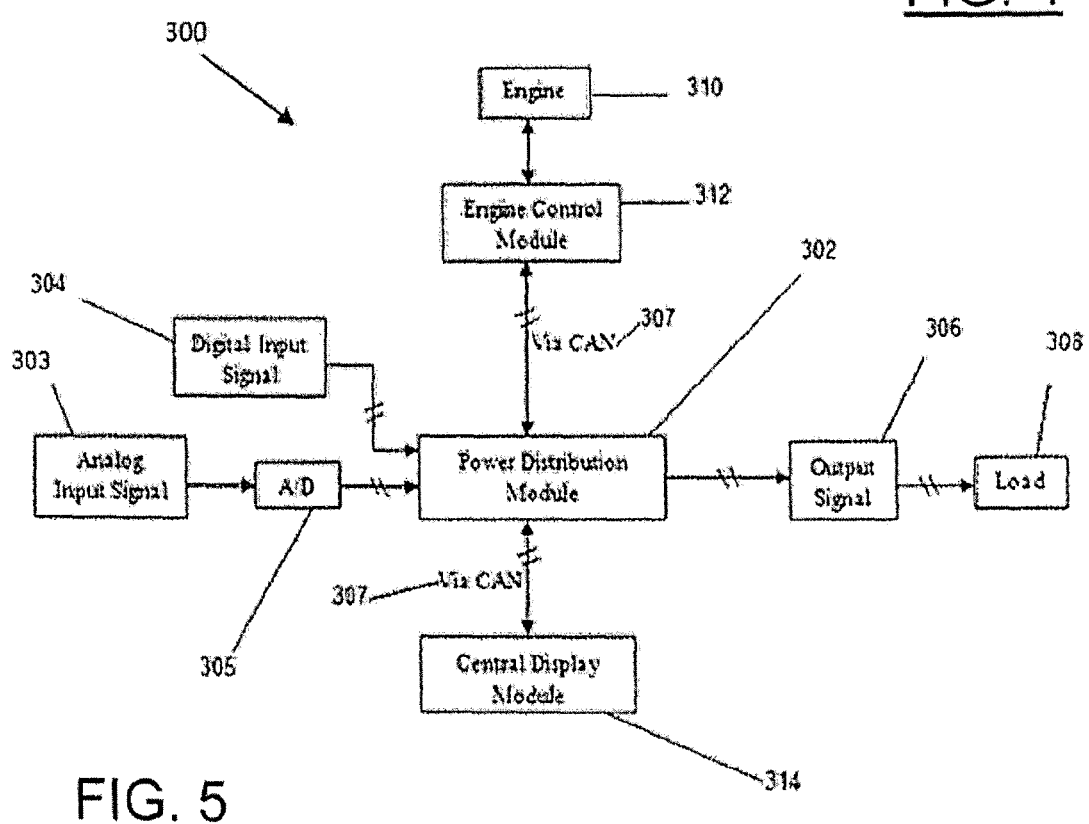
FIG. 5 illustrates a block diagram representing functioning of the power distribution module 200 of FIGS. 1 and 2.

FIG. 5 represents a block diagram 300 describing the working of the power distribution module 302. The power distribution module 302 is an all-solid-state switching module that is configurable on-the-fly via CAN or via any suitable communication media 307. Each power distribution module 302 is wired or wirelessly connected by CAN 307 to a central display 314 at the helm and to the engine control module (ECM) 312.

Display Module.

The central display module 314 acts as a user interface which is associated with a software program to interact with all the modules, thereby enabling troubleshooting, and arbitrates between various display arrangements. The central display module 314 acts as a master device for the watercraft. The display 314 will send configure messages on boot up to assure that the power distribution module 302 is configured as expected. Upon operation, based on user interface, the display 314 sends messages to turn on and off outputs in the power distribution modules 302. This is done through a CAN message or via any communication network message 307. Signals communicated are the desired pulse width modulation (PWM) level in percent. In sequence of turning on loads 308 the software in the display 314 calculates the level of the loads 308 and turns the output off after the desired condition or time has been reached. In an exemplary embodiment, the power distribution module 302 may communicate directly with other such modules to control several loads simultaneously.

PDM Function.

Each power distribution module 302 is capable of making switching decisions from up to twelve on/off digital inputs 304 and eight analog inputs 303. The analog inputs 303 are ranged between 0 V to 5 V, with analog to digital (A/D) conversion 305. It is capable of sending up to twelve load output signals 306 to control the loads 308, wherein the various loads 308 might be trim level, ballast level, lights, horn, fuel level, field level, air temperature, oil pressure, coolant temp, live well pumps, wakeplate position, engine ignition, accessory circuits, engine hatch actuators, engine senders, rudder angle sender, etc. Further the power distribution module 302 is configured to calculate motor position, motor speed, and motor rate. Also it is configured to provide constant electrical feedbacks such as power in watts and current in amperes.

Wire Harnesses.

The switching is configurable with H-bridges to control reversible loads, such as to achieve motor braking on the trim tab motors 106a, 106b.

Further the power distribution module 302 provides simplified and affordable solution to wire harnesses, mounting rigs, circuit protections, and noise protections.

Power Source.

In another embodiment of the invention, each power distribution module 302 is connected to a source of power which, for example might take the form of a power distribution block or a direct connection to a power source such as a battery or other power source such as solar cells, depending upon the specific configuration. In response to information communicated and commands received via the communication network 307, power is delivered to respective outputs by the corresponding power distribution module 302.

Alternatives.

While embodiments of the present invention have been illustrated and described, it will be clear that the present invention is not limited to these embodiments only. Numerous modifications, changes, variations, substitutions and equivalents will be apparent to those skilled in the art, without departing from the spirit and scope of the present invention. In any case, because the scope of the present invention is much broader than any particular embodiment, the foregoing detailed description should not be construed as a limitation of the scope of the present invention.

Preferred embodiments of the present invention will contain a variety of presently available sensors to sense and transmit various craft operating conditions (sensed conditions) referred to herein as the input parameters. For example, in the preferred embodiment, the craft has sensors that detect the vertical motion (pitch), horizontal motion (yaw), pitch angle, manual control status, GPS position and motion of the craft, the craft water speed, the craft engine RPM and the hull stress of the craft. The presently described embodiment of the invention uses a number of presently available components including controls, actuators, sensors, and communication means to provide the input parameters containing information regarding the craft operating conditions.

Those skilled in the art will have understanding of the various configurations, combinations, and subcombinations of sensors and input parameters that may not have been specifically disclosed but would fall within the scope of the invention. It should be understood, though, that such sensors come in many forms and may include accelerometers, angle sensors, angle position sensors, encoders, strain gauges, electronic devices, and any other means known to or later discovered by those of skill in the art to detect and report conditions of the corresponding devices and operating and environmental conditions. It should also be understood that many such sensors may be integral with accompanying actuators or other components even though they may be shown discreetly. Also, understand that equivalent sensors may approximate sensing of the intended object by approximating from other indicators or other algorithms.

Additionally, such other embodiments may contain a different combination of sensors providing a different combination of measurements of the craft operating conditions. All such sensors communicate their information to a microprocessor microcontroller.

Microprocessor Microcontroller.

The microprocessor microcontroller of each module 102-104 uses one or more presently available computing devices that contain a processor, memory, one or more input means, and one or more output means. The microprocessor microcontroller preferably stores part, or all, of a porpoising detection algorithm and a control motor speed algorithm. The microprocessor microcontroller receives information on the sensed conditions and detects the presence or absence and degree of porpoising according to the porpoising detection algorithm. When the porpoising detection algorithm indicates the presence of porpoising, the microprocessor microcontroller calculates the most desired control motor speeds according to the control motor speed algorithm. The microprocessor microcontroller then outputs craft control actions communicating the appropriate output parameters to the appropriate craft controllers.

Preferred embodiments of the present invention will contain a variety of presently available craft controllers to accept the output parameters. For example, in a preferred embodiment, the craft has controllers that can modify the propeller speed, stern rudder angle, trim tabs angle, ballast redistribution, engine RPM, outboard motor angle, manual control override, and keel(s) adjustment.

As with the input parameters, those skilled in the art will have understanding of the various configurations, combinations, and subcombinations of controllers and output parameters that may not have been specifically disclosed but would fall within the scope of the invention. It should be understood, though, that such controllers come in many forms.

Porpoising Detection Algorithm

A porpoising detection algorithm is preferably implemented in the microprocessor microcontroller. The porpoising detection algorithm may include any common or advanced control loop transfer function including, but not limited to, series, parallel, ideal, interacting, noninteracting, analog, classical, and Laplace types. The porpoising detection algorithm calculates absence or presence of porpoising in the craft and if present the degree of porpoising using the input information received by the input parameters.

Control Motor Speed Algorithm

A control motor speed algorithm is preferably implemented in the microprocessor microcontroller. The control motor speed algorithm may include any common or advanced control loop transfer function including, but not limited to, series, parallel, ideal, interacting, noninteracting, analog, classical, and Laplace types. The control motor speed algorithm receives information on the presence and degree of porpoising from the porpoising detection algorithm. In the presence of porpoising, the control motor speed algorithm calculates optimal craft control actions to minimize, reduce, or eliminate the porpoising. The control motor speed algorithm then outputs the correct craft control actions to the appropriate output parameter craft controllers.

The control motor speed algorithm is optimized to achieve accurate modulation of the available control mechanisms such as trim tabs or thrust adjustments (i.e., throttle or cruise control interventions). By using the information from the input parameters, the control motor speed algorithm can be tuned to calculate the craft control actions that optimize fuel consumption, steering, passenger comfort, engine wear, and other matters.

Based on the input information, the control motor speed algorithm calculates craft control actions for any of the craft controllers implemented in the particular embodiment. For each craft controller it is controlling, the control motor speed algorithm calculates a desired action and a corresponding craft controller command to achieve as much. The control motor speed algorithm calculates the desired action based on the sensed conditions. However, because of the inherent limits of the steering system or other craft conditions, the desired action may not be achievable, either instantaneously or at all. A craft controller action limiting function may also be implemented in the control motor speed algorithm or by some other means, or may not be necessary based on the type of the watercraft's craft controls.

The control algorithm preferably includes a comparator function with which the control motor speed algorithm compares the desired craft control action with the current craft conditions as detected by input parameter sensors. The control motor speed algorithm produces a series of intermediate craft control actions that achieve the desired craft control actions without exceeding the craft control system's maximum permissible rate of change or operating limits. Further, the control motor speed algorithm is adapted to limit the craft control actions to the watercraft's mechanical limits. The control motor speed algorithm also preferably contains a smoothing function to avoid rapid changes in craft control actions. The smoothing function compensates for noise in sensors or controls and for rapid fluctuations in sensed conditions.

The control motor speed algorithm is based on mathematical models for the resulting forces acting on the multiple axes of the watercraft during porpoising. Formulas to approximate these forces are known in the art. However, numerous complexities affecting these forces also exist such as hull interaction with flow around the rudder (hull wake), rudder physical profile (e.g., hydrofoil shape, chord length, rudder thickness), turbulence of inflow to the rudder, and other factors. These complexities are preferably approximated in the control motor speed algorithm using constants. The constants of control motor speed algorithm may be tuned for different types of watercraft through experimentation and testing.

Irrespective of the other preferred details in the porpoising detection algorithm and the control motor speed algorithm, both algorithms monitor a variety of sensed conditions to determine when porpoising is occurring and what craft control actions are needed to reduce or eliminate porpoising. The control motor speed algorithm also includes internal limitations for other operating and safety considerations. For example, regardless of sensed conditions, the control motor speed algorithm never commands a craft control action in excess of the mechanical or safety limits of the craft or the specifically controlled subsystem. In case of certain sensor failures, the electronic controller informs the operator a failure has occurred and calculates the optimal craft control actions to minimize, reduce, or eliminate the porpoising taking into account the failure. In case of microprocessor microcontroller, fail-safe means allows the watercraft's manual steering system to resume unaided control of the craft.

Depiction of Input and Output Parameters in Other Embodiments

A three-axis accelerometer provides measurements of the movement of the watercraft in three dimensions to the microprocessor microcontroller. This provides information corresponding to the input parameters vertical motion (pitch), horizontal motion (yaw), and pitch angle. A GPS provides information regarding the GPS position/motion and the craft water speed to the microprocessor microcontroller. In addition to the input parameters listed above, a sensor detecting the status of the manual controls provides this information to the microprocessor microcontroller. Finally, a sensor relates information about the engine RPM from the motor & steering to the microprocessor microcontroller.

With the information provided by the input parameters described above the microprocessor microcontroller continually runs the porpoising detection algorithm. Once the presence of porpoising has been indicated by the porpoising detection algorithm, microprocessor microcontroller runs the control motor speed algorithm. The control motor speed algorithm calculates optimal craft control actions to minimize, reduce, or eliminate the porpoising and outputs the correct craft control actions to the appropriate output parameter craft controllers.

In this embodiment, the microprocessor microcontroller outputs craft control actions to motor & steering unit and to the mechanisms providing hull adjustments. Such hull adjustments may be accomplished by, for example, an aft rudder. The microprocessor microcontroller may also use the manual controls as a craft control device. In this embodiment, the microprocessor microcontroller outputs control actions adjusting propeller speed, engine RPM, and outboard motor angle to the motor & steering unit. The microprocessor microcontroller also outputs craft control actions adjusting stern rudder angle and trim tabs angle to the hull adjustments. The microprocessor microcontroller can also send manual control override actions to the manual controls.

It should be noted that in this embodiment, the certain of the various input and output parameters may share input parameter signal pathways with the corresponding output parameters craft control action signal pathways. Specifically the motor & steering sensor, the hull adjustments, and the manual controls each potentially shares an input parameter signal transmission pathway with its corresponding output parameter craft control action pathway.

Input and Output Parameters in Other Embodiments

Other embodiments utilize various configurations, combinations, or subcombinations of input parameters and output parameters. A discrete sensor box or unit may be placed in separate locations in the watercraft. This provides information from various locations on the craft to the microprocessor microcontroller. There may also be multiple sensor box units of the same or similar sensor types placed in various locations in the watercraft to provide more information about the motions and forces the craft is experiencing to the microprocessor microcontroller.

A multi-axis accelerometer provides measurements of the movement of the watercraft in multiple dimensions to the microprocessor microcontroller. Additionally, a gyroscope provides information measuring or maintaining orientation, based on the principles of angular momentum. Note also that the multi-axis accelerometer sensor box and the gyroscope may be paired as a unit or may be separate. Additional sensors include a water speed sensor, a GPS, a sensor detecting the status of the manual controls, and a sensor relating information about the engine RPM to the microprocessor microcontroller. Also, note that the water speed sensor box is less critical, particularly given that water speed is usually determined by GPS.

The multi-axis accelerometer module may be positioned forward (or aft, as an alternative) of the boat's center of gravity (CG). It should be understood, though, that the accelerometer module as well as the gyro may be embodied either together in one housing or as multiple independent accelerometers and gyros spaced around the boat. Although keeping them in one location can be beneficial to cost and ease of installation, the spaced-around alternative allows the processor to take advantage of the fact that different locations will respond more or less dramatically to different hull motions based on where they are located. Irrespective, electronic and algorithmic adjustments will be evident to those skilled in the art in order to help compensate for wherever the various accelerometer and gyro components may be located.

As with other embodiments of the invention, the microprocessor microcontroller continually runs the porpoising detection algorithm using the information provided by the input parameters. Once the presence of porpoising has been indicated by the porpoising detection algorithm, microprocessor microcontroller runs the control motor speed algorithm. The control motor speed algorithm calculates optimal craft control actions to minimize, reduce, or eliminate the porpoising and outputs the correct craft control actions to the appropriate output parameter craft controllers.

In this embodiment the microprocessor microcontroller outputs craft control actions to the propeller speed module, the weigh distribution module (that may control ballast pumps or other appropriate devices), and the hull adjustments module.

Alternative Components

Even though the foregoing embodiments represent the most preferred at present, those of ordinary skill in the art will recognize many possible alternatives that we have not expressly suggested here. While the foregoing written descriptions enable one of ordinary skill to make and use what is presently considered the best modes of the invention, those of ordinary skill will understand and appreciate the existence of variations, combinations, and equivalents of the specific embodiment, method, and examples herein. The drawings and detailed descriptions herein are illustrative, not exhaustive. They do not limit the invention to the particular forms and examples disclosed. To the contrary, the invention includes any further modifications, changes, rearrangements, substitutions, alternatives, design choices, and embodiments apparent to those of ordinary skill in the art, without departing from the spirit and scope of this invention, as defined by any claims included herewith or later added or amended in an application claiming priority to this present filing. The invention covers all embodiments within the scope and spirit of such claims, irrespective of whether such embodiments have been remotely referenced here or whether all features of such embodiments are known at the time of this filing. Thus, the claims should be interpreted to embrace all further modifications, changes, rearrangements, substitutions, alternatives, design choices, and embodiments that may be evident to those of skill in the art. In any case, all substantially equivalent systems, articles, and methods should be considered within the scope of the present invention.

We claim:

1. A sport and ski watercraft power management and distribution system for use in monitoring and controlling a flow of electrical power from a source of electrical power to electrical loads on the sport and ski watercraft, said power management and distribution system comprising:
a. an electric power supply suitable for use in powering sport and ski watercraft, said electric power supply being electrically connectable to the source of electrical power;
b. a multinodal control network for controlling power distribution from said electric power supply to multiple groupings of loads, said groupings including first and second groupings of loads, said first grouping (a "helm grouping") comprising loads located in the vicinity of the helm of the watercraft, and said second grouping of loads (a "stern grouping") comprising loads located in a stern region of the watercraft, said stern grouping comprising at least two kinds of attitude control actuators for varying the attitude of the watercraft in water;
c. said network including a first power distribution module controlling power distribution to said stern grouping, said first power distribution module communicating with a first data processor component contained within a housing of said first power distribution module; and
d. said processor being adapted to determine conditions of at least one of said attitude control actuators.

2. A sport and ski watercraft power management and distribution system as in claim 1, wherein:
a. said attitude control actuators comprise attitude control motors;
b. conditions for which said processor is adapted to determine include motor speed or motor position;
c. the source of electrical power comprises a battery with a positive terminal; and
d. said electric power supply comprises an insulated electric power lead connectable to the positive terminal of the battery.

3. A sport and ski watercraft power management and distribution system for use in monitoring and controlling a flow of electrical power from a source of electrical power to electrical loads on the sport and ski watercraft, said power management and distribution system comprising:
a. a plurality of power control modules, each of the power control modules constructed and arranged to receive electrical input signals representative of:
  i. a position and movement of the sport and ski watercraft with respect to the water;
  ii. operating parameters of a motor powering the sport and ski watercraft;
  iii. operating parameters of other systems on the sport and ski watercraft requiring the use of electrical power;
b. a power flow communication network for interconnecting each power control module within said plurality of power control modules; and
c. a helm-mounted module providing an operator of the sport and ski watercraft with both a visual display of and the ability to control the movement of the sport and ski watercraft with respect to the water, the operating parameters of the motor powering the sport and ski watercraft, and the operating parameters of the other systems on the sport and ski watercraft requiring the use of electrical power.

4. The power management and distribution system as defined in claim 3 wherein each power control module within said plurality of power control modules is assigned to a region of the motor powered sport and ski watercraft.

5. The electrical power management and distribution system as defined in claim 3 wherein each power control module within said plurality of power control modules includes a microprocessor which performs one or more the following functions:
monitor voltages and currents of the electrical power flowing into or out of said power control module;
monitor a difference of said voltages and currents relative to a steady state or a predetermined calibration rate; and
monitor a rate of change of said voltages and currents.

6. A sport and ski watercraft power management and distribution system as in claim 3, wherein the source of electrical power comprises a battery with a positive terminal, and said electric power supply comprises an insulated electric power lead connectable to the positive terminal of the battery.

7. The power management and distribution system as defined in claim 3 wherein said electrical power flow communication network uses a controller area network protocol strategy.

8. The power management and distribution system as defined in claim 3 wherein said position and movement of the sport and ski watercraft with respect to the water are selected from a group of parameters including: pitch, yaw, speed, direction of travel, trim tab or wake plate position, ballast tank fill level, and rudder position.

9. The power management and distribution system as defined in claim 3 wherein operating parameters of the motor powering the sport and ski watercraft are selected from a group of parameters including: motor rpm, motor temperature, motor fuel use, motor position, motor oil pressure, and motor coolant temperature.

10. The power management and distribution system as defined in claim 3 wherein the operating parameters of the other systems on the sport and ski watercraft requiring the use of electrical power are selected from a group of parameters including water depth measurement, water temperature measurement, air temperature measurement; passenger heating or cooling systems; sound and communication systems, on-board lighting; live well water level and water temperature control, horn operation, motor ventilation, motor hatch operation, hull stress and switch blade position.

11. The power management and distribution system as defined in claim 3 wherein said helm mounted module provides a visual indication of a position of mechanical controls used in the operation of the sport and ski watercraft.

12. A method of providing an open, multi-nodal, controller area electrical power control system on a motor powered sport or ski watercraft, said method comprising the steps of:
positioning a power control module at each region of the sport or ski watercraft;
providing electrical signal inputs to said power control module for each system within said region of the sport or ski watercraft which requires the use of electrical power;
processing said electrical signal inputs using a microprocessor within said power control module;
producing electrical signal outputs from said power control module to govern:
  position and movement of the sport or ski boat with respect to the water;
  position and operation of the motor powering the sport or ski watercraft through the water;
  operation of other systems on the sport or ski watercraft requiring the use of electrical power; and
monitoring the operation of the open, multi-nodal, controller area electrical power control system on a visual display at a helm of the motor powered sport or ski watercraft.

13. The method as defined in claim 12 wherein said electrical signal inputs to said power control module may be analog or digital.

* * * * *